Nov. 11, 1952  CHUNG CHIN KAO ET AL  2,617,386
COPYHOLDER
Filed May 20, 1949                              3 Sheets-Sheet 1
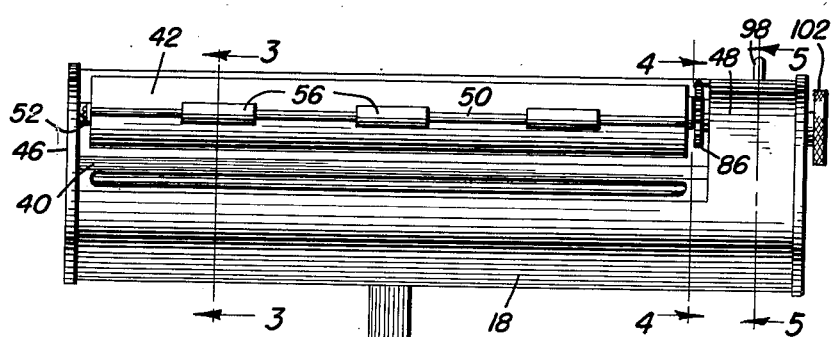
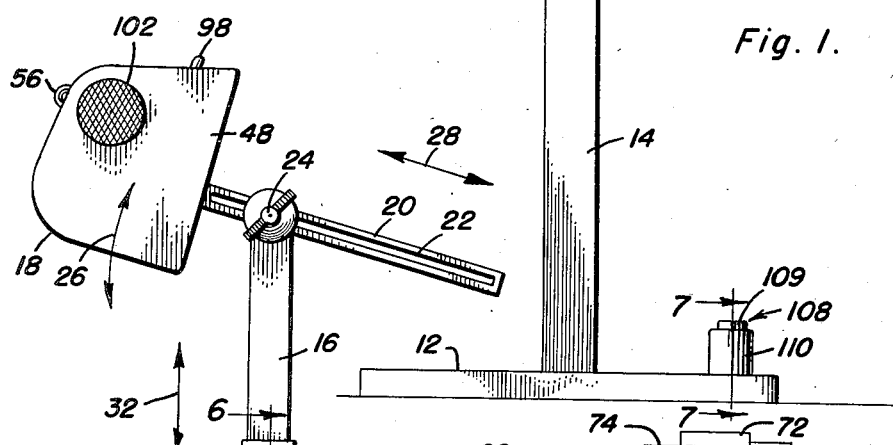
Inventors
Chung Chin Kao
Joseph Terrence Donnelly
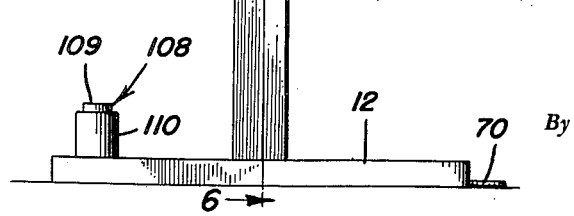
Attorneys Nov. 11, 1952　　CHUNG CHIN KAO ET AL　　2,617,386
COPYHOLDER Filed May 20, 1949　　　　　　　　　　　3 Sheets-Sheet 2

Inventors
Chung Chin Kao
Joseph Terrence Donnelly

By *Clarence A. O'Brien
and Harvey B. Jacobson*
Attorneys

Nov. 11, 1952     CHUNG CHIN KAO ET AL     2,617,386
COPYHOLDER
Filed May 20, 1949                                     3 Sheets-Sheet 3
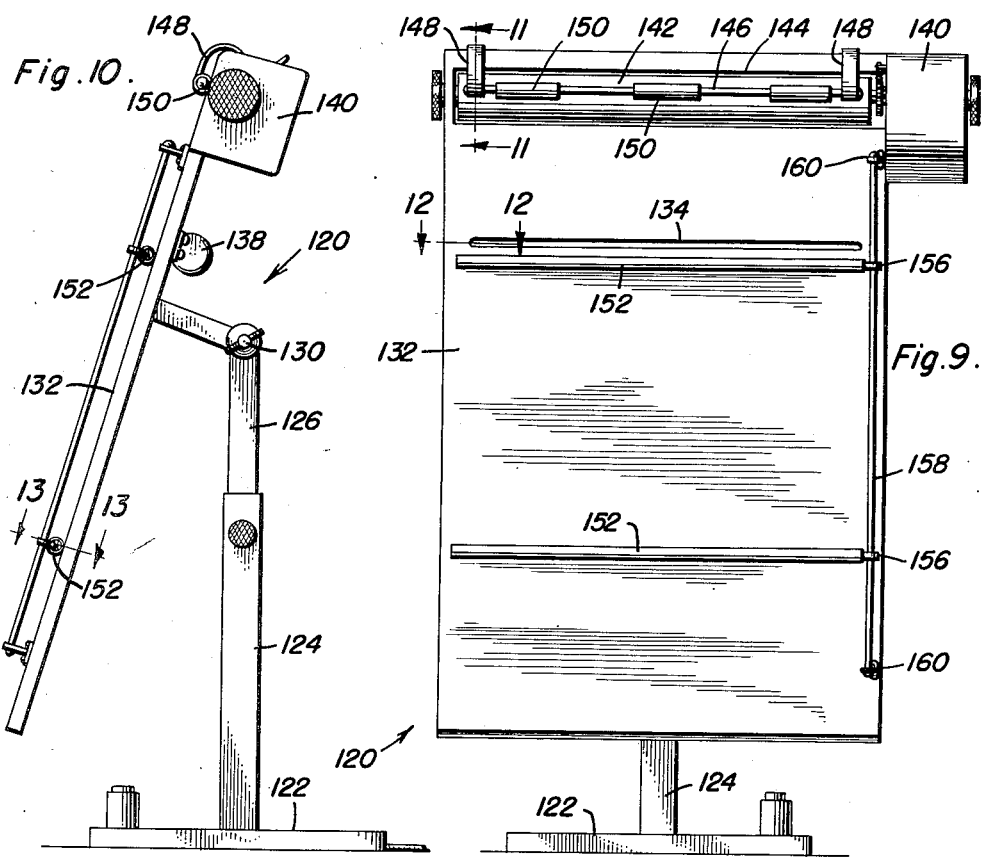
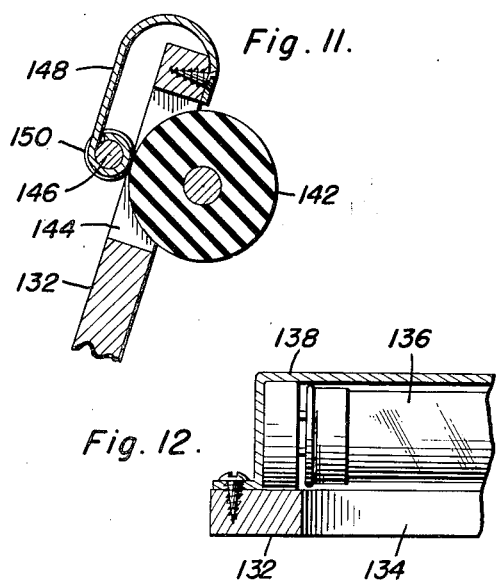
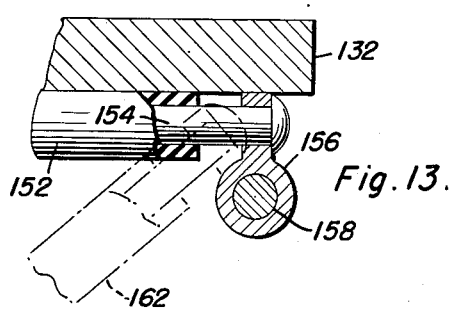
Inventors
Chung Chin Kao
Joseph Terrence Donnelly
By Clarence A. O'Brien
and Harvey B. Jacobson
Attorneys Patented Nov. 11, 1952

2,617,386

UNITED STATES PATENT OFFICE 2,617,386

COPYHOLDER

Chung Chin Kao, Freeport, and Joseph Terrence Donnelly, Ozone Park, N. Y.

Application May 20, 1949, Serial No. 94,444

1 Claim. (Cl. 120—32)

This invention relates to new and useful improvements and structural refinements in copyholders, that is, devices employed by stenographers, typists, etc. for holding a sheet of paper while material is being copied or transcribed therefrom, and the principal object of the invention is to facilitate performance of the copying or transcribing operation with extreme speed, convenience and accuracy.

This object is achieved by the provision in the copyholder of a source of light adapted to project a narrow, horizontal beam to illuminate a typewritten line on the sheet being copied, so that the attention of the typist is readily directed to the proper point on the work and the work itself is properly illuminated so that it may be easily and conveniently read.

Another feature of the invention resides in the provision of means for step-by-step advancing the sheet being copied so as to successively direct the "indicator" beam of light on the typewritten line in coordination with the progress of the typist along the sheet, these means for advancing the sheet being actuated and remotely controlled by electrical devices in response to the touch of the typist's fingers, or by foot pressure, as desired.

A still further feature of the invention resides in the provision of means for pre-adjusting the "step-by-step" advancing means, so that the sheet being copied may be advanced one or two lines at a time, in conformity to single or double spacing.

Some of the advantages of the invention reside in its simplicity of construction, in its convenient and expeditious operation, and in its adaptability to economical manufacture.

With the above more important objects and features in view and such other objects and features as may become apparent as this specification proceeds, the invention consists essentially in the construction and arrangement of parts as shown in the accompanying drawings, in which:

Figure 1 is a front elevational view of the invention;

Figure 2 is a side elevational view thereof;

Figure 8 is a wiring diagram of the electrical components used in the invention;

Figure 9 is a front elevational view of a modified embodiment of the invention;

Figure 10 is a side elevational view of the embodiment shown in Figure 9;

Figure 11 is a cross-sectional detail, taken substantially in the plane of the line 11—11 in Figure 9;

Figure 12 is a cross-sectional detail, taken substantially in the plane of the line 12—12 in Figure 9; and Figure 13 is a cross-sectional detail, taken substantially in the plane of the line 13—13 in Figure 10.

Like characters of reference are used to designate like parts in the specification and throughout the several views.

Figures 3, 5:
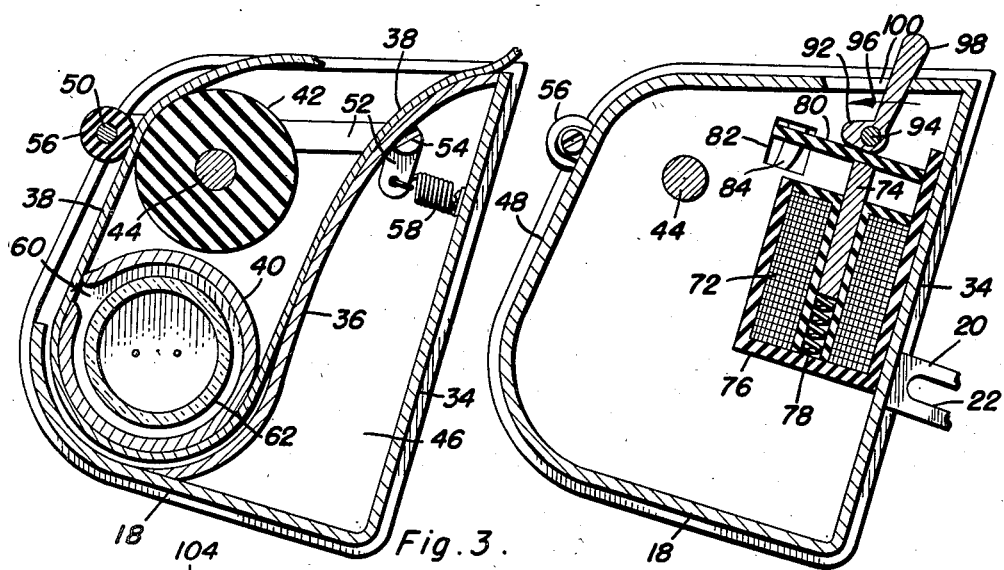
Figure 3 is a cross-sectional view, taken substantially in the plane of the line 3—3 of Figure 1.
Figure 5 is a cross-sectional view, taken substantially in the plane of the line 5—5 in Figure 1.
Figure 6:
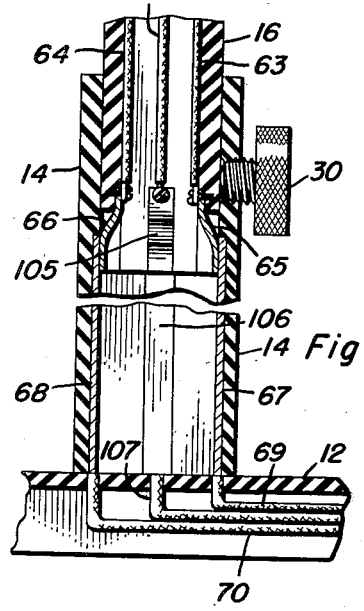
Figure 6 is a cross-sectional detail, taken substantially in the plane of the line 6—6 in Figure 2.

Referring now to the accompanying drawings in detail, more particularly to Figures 1-8 thereof, the invention consists of a copyholder designated generally by the reference character 10, the same embodying in its construction a suitable base 12 provided with a hollow, upright standard 14, in the upper end portion of which, in turn, is slidably telescoped an extension 16.

A horizontally elongated holder 18 is provided on the back wall thereof with a rearwardly projecting arm 20 which, in turn, is formed with a longitudinal slot 22 to receive a clamping screw 24 whereby the entire holder 18 is adjustably attached to the extension 16 of the standard 14, as will be clearly apparent. In other words, by virtue of the clamping bolt 24 and the slot 22, the holder 18 may be raised or lowered, as indicated at 26 in Figure 2, and may also be slid forwardly and rearwardly as indicated at 28 in the same figure.

A suitable clamping screw or set screw 30 is provided in the upper end portion of the standard 14 and is frictionally engageable with the extension 16 so that the holder, together with the extension, may also be slid upwardly and downwardly as indicated at 32 in Figure 2. It will be noted that these various adjustments facilitate versatile setting of the holder 18 relative to the base 12, so that the typist may arrange the device in a manner best for her own requirements.

As has been already stated, the holder 18 is provided with a back wall 34 to which the arm 20 is attached, and also includes a front wall 36 which is substantially S-shaped in cross-section, as is clearly shown in Figure 3. This front wall provides a guide, so to speak, for a sheet of paper 38 which is to be copied, this sheet being passed downwardly around a tubular sheet receiving member 40 and then upwardly over a rotatable platen or roller 42 which is mounted upon a shaft 44 extending longitudinally in the holder 18.

The platen 42 is disposed above the sheet receiving member 40 and one end of the shaft 44 is journaled in an end plate 46 of the holder 18, it being noted that the holder at its remaining end is provided with an enclosure or housing 48 which provides a bearing for the remaining end of the shaft 44.

A guide bar 50, carried by suitable bellcranks 52 pivoted, as at 54, in the holder 18, supports a plurality of rollers 56, and suitable springs 58 are connected to the cranks 52 for urging the rollers 56 and the sheet of paper 38 against the platen 42, as will be clearly apparent.

It is to be noted that the sheet 38 passes over a narrow, horizontal slot 60 with which the tubular member 40 is formed, and a source of electric light, preferably in the form of a fluorescent tube 62, is positioned in the member 40, this being so arranged that the lamp 62 projects a narrow, horizontal beam through the slot 60 and through the sheet of paper 38, the width of the beam corresponding substantially to the height of a typewritten line on the sheet, so that the attention of the typist is attracted to the appropriate line being copied and the line of work is properly illuminated to avoid eye strain. Alternatively, a relatively narrow beam may be used to underline or underscore the typewritten line, where actual illumination of the work by the lamp 62 is considered undesirable.

The lamp 62 receives its supply of electric current through the medium of a pair of conductors 63, 64 which extend downwardly through the extension 16 and are connected to a pair of resilient brushes 65, 66. The latter, in turn, frictionally engage a pair of bus bars 67, 68 provided in the standard 14, this current collecting arrangement facilitating operation of the lamp 62 notwithstanding vertical adjustment of the extension 16 relative to the standard 14. The bus bars 67, 68 are, of course, connected to suitable wires 69, 70 extending through the base 12 to a source of electric supply.

Means are also provided for advancing the sheet 38 "step by step" over the slot 60 in the member 40 so that the typewritten lines on the sheet may be successively brought into view, these advancing means involving the provision of a solenoid 72 which is disposed in the enclosure 48 and is equipped with a reciprocable armature 74. The solenoid 72 is contained in a suitable housing 76 and a compression spring 78 is provided in this housing for urging the armature 74 upwardly or outwardly when the solenoid is not energized.

Figure 4:
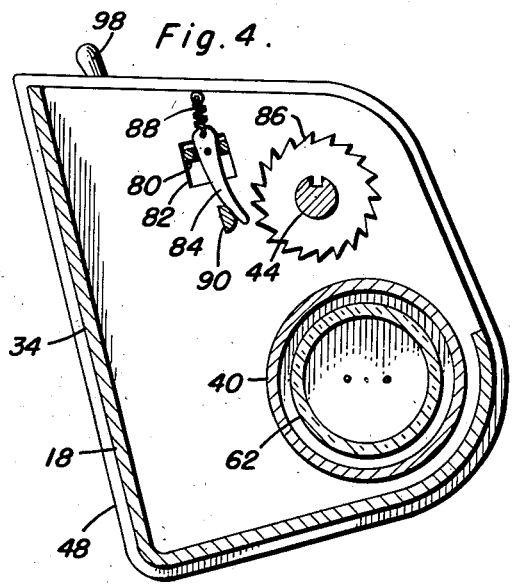
Figure 4 is a cross-sectional view, taken substantially in the plane of the line 4—4 in Figure 1.
Figure 7:
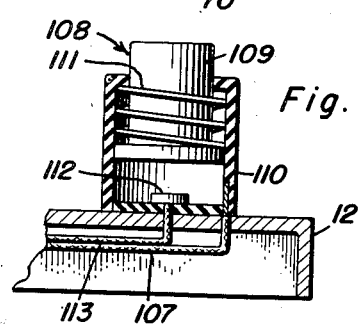
Figure 7 is a cross-sectional detail, taken substantially in the plane of the line 7—7 in Figure 1.

The outer end of the armature 74 has secured thereto an extension 80 which projects outwardly through a slot or opening 82 formed in the enclosure 48, the outer end of the extension 80 being equipped with a pivoted pawl 84 to operatively engage a ratchet wheel 86 secured to the shaft 44 of the platen 42. A short tension spring 88 is connected to the pawl 84 for normally urging the latter out of engagement with the ratchet 86 and a stop pin 90 is also provided on the outside of the enclosure 48 to function as a rest and a guide for the pawl 84, as is indicated in Figure 4.

It will be apparent from the foregoing that when the solenoid 72 is energized, the armature 74 will be drawn into the solenoid against the resiliency of the spring 78, and the extension 80 will cause the pawl 84 to engage the ratchet 86, thus rotating the ratchet and the associated platen 42 and advancing the sheet 38 through a predetermined distance over the slot 60, that is, from one line of text to the next line on the sheet 38. In other words, reciprocation of the armature 74 will impart intermittent, unidirectional rotation to the platen 42, it being understood that as soon as the solenoid 72 is de-energized, the spring 78 will force the armature 74 out of the solenoid and the spring 88 will disengage the pawl 84 from the ratchet 86 in readiness for the next cycle of operation.

To facilitate preadjustment of the device so as to accommodate single spaced as well as double spaced sheets, a cam 92 may be pivotally mounted in the enclosure 48, as at 94, being adapted to engage the extension 80 of the armature 74, the cam 92, in effect, constituting a stop for outward movement of the armature 74, so that when the cam is in the position shown in Figure 5, the armature will have the maximum movement, sufficient to advance the platen 42 and the sheet 38 through a space of two typewritten lines. However, when single spacing is employed, the cam 92 is simply rotated in the direction of the arrow 96, so that outward movement of the armature 74 is correspondingly decreased and rotation imparted to the platen 42 on the inward stroke of the armature 74 is decreased accordingly. The cam 92 may be simply set by means of a lever 98 which projects outwardly from the enclosure 48 through a slot 100.

It is to be noted that although the rotation of the platen 42 is to be effected electromagnetically, a hand knob 102 may also be secured to the shaft 44 for rotating the platen manually when so desired.

One wire 103 of the solenoid 72 is connected within the holder 18 to the conductor 63 of the lamp 62, while the second wire 104 of the solenoid is connected to a brush 105 similar to the brushes 65, 66. The brush 105 is disposed in the extension 16 and engages a bus bar 106 in the standard 14, the bar 106, in turn, being connected by a wire 107 to a switch 108. This switch, of the "momentary contact" variety, is mounted on the base 12 and consists of a depressible button 109 slidable in an enclosure 110 against the resiliency of a spring 111, the button 109 being electrically engageable with a contact 112 so that by simply depressing the button 109, electrical connection through the switch may be established. A wire 113 connects the switch contact 112 to the supply wire 70, it being apparent that the lamp 62 operates continuously and independently of the energization of the solenoid, the latter being activated only when it is necessary to advance the sheet 38 over the slot 60.

For finger control operation, the switch 104 may be positioned on the base 12, as described, and alternatively, or in addition, a similar switch 114, connected in parallel to the switch 108, may be used on the floor, for actuation by foot pressure. In any event, the electromagnetic means for advancing the sheet 38 will, of course, eliminate the necessity of the typist reaching to the copyholder to advance the sheet manually, as will be clearly apparent.

It should be explained that the standard 14 and extension 16 are polygonal in cross-section, so that they are relatively slidable but non-rotatable, whereby the brushes 65, 66, 105 are retained in alignment with the respective bus bars 67, 68 and 106.

Referring to the modified embodiment of the invention illustrated in the accompanying Figures 10-13 inclusive, the same is designated generally by the reference character 120 and is similar to the embodiment 10 insofar that it includes a base 122, a standard 124, and an extension 126 to which is adjustably connected by a clamping screw 128 an arm 130 carrying a sheet-receiving member 132.

However, in this instance, the member 132 assumes the form of a plate provided with a transverse slot 134 behind which is positioned a fluorescent tube 136 in a housing 138 secured to the rear surface of the member 132, as will be clearly apparent.

A solenoid actuated mechanism (not shown) similar to that already described is mounted in an enclosure 140 for advancing the sheet over the slot 134, this mechanism including a rotatable platen 142 disposed in a slot 144 with which the upper portion of the plate or member 132 is provided. A guiding bar 146, carried by a plurality of resilient fingers 148 secured to the plate 132, is equipped with a plurality of rollers 150 which maintain the upper portion of the sheet in engagement with the platen 142, and, in addition, means are provided for maintaining the sheet in a flat position on the plate 132, as will be presently described.

These last-mentioned means simply consist of a plurality of rollers 152 mounted on shafts 154 extending transversely of the plate 132, the shafts 154 being secured at one end thereof to suitable brackets 156 rotatable and slidable on a rod 158 which is secured, as at 160, to one side portion of the plate 132.

It will be observed from the foregoing that the rollers 152 will maintain a sheet of paper in a flatly lying position on the plate 132, but by virtue of the brackets 156 which are rotatable on the rod 158, the rollers 152 may be swung forwardly and laterally as indicated at 162, so that the sheet of paper may be applied to or removed from the copyholder when so desired. The slidability of the brackets 156 on the rod 158 facilitates vertical adjustment of the rollers 152 on the plate 132, it being understood that the weight of the rollers and the shafts 154, supported only at one end by the brackets 156, is sufficient to prevent undesired sliding of the brackets on the rod 158.

It is believed that the advantages and use of the invention will be clearly apparent from the foregoing disclosure, and accordingly, further description thereof at this point is deemed unnecessary.

Having described the invention, what is claimed as new is:

In a copyholder, the combination of a housing including a reversely curved sheet guiding wall having a substantially semi-cylindrical lower portion terminating in a transverse edge at the front of the housing, a tubular member disposed coaxially in said lower portion of said wall and closely spaced therefrom to provide a sheet passage having an upwardly directed outlet at said transverse edge, said tubular member being provided with a slot parallel to said transverse edge and disposed above the outlet of said passage, an elongated lamp provided in said member and adapted to project a beam of light outwardly through said slot, and means provided in said housing above said member for drawing a sheet through said passage and over said slot.

CHUNG CHIN KAO.
JOSEPH TERRENCE DONNELLY.

REFERENCES CITED

The following references are of record in the file of this patent:

UNITED STATES PATENTS

| Number | Name | Date |
|---|---|---|
| 1,265,396 | Sherwood | May 7, 1918 |
| 1,279,820 | Brassard | Sept. 24, 1918 |
| 1,460,923 | Searle | July 3, 1923 |
| 1,499,582 | Laguionie | July 1, 1924 |
| 1,710,207 | Cook | Apr. 23, 1929 |
| 2,153,103 | Stevens | Apr. 4, 1939 |
| 2,236,133 | Croninger et al. | Mar. 25, 1941 |